US012810731B2

(12) United States Patent
Ferone

(10) Patent No.: US 12,810,731 B2
(45) Date of Patent: Nov. 24, 2026

(54) SYSTEMS AND METHODS FOR COORDINATING AND ALIGNING GROUPED VEHICLES BY REAR-SECTIONS

(71) Applicant: Toyota Motor Engineering & Manufacturing North America, Inc., Plano, TX (US)

(72) Inventor: Christopher A Ferone, Ann Arbor, MI (US)

(73) Assignees: Toyota Motor Engineering & Manufacturing North America, Inc., Plano, TX (US); Toyota Jidosha Kabushiki Kaisha, Toyota Aichi-ken (JP)

( * ) Notice: Subject to any disclaimer, the term of this patent is extended or adjusted under 35 U.S.C. 154(b) by 96 days.

(21) Appl. No.: 18/474,496

(22) Filed: Sep. 26, 2023

(65) Prior Publication Data

US 2025/0104563 A1 Mar. 27, 2025

(51) Int. Cl.
*B60W 40/10* (2012.01)
*G08G 1/00* (2006.01)

(52) U.S. Cl.
CPC ............... *G08G 1/22* (2013.01); *B60W 40/10* (2013.01)

(58) Field of Classification Search
CPC ....... B60W 40/10; B60W 30/165; G08G 1/22
See application file for complete search history.

(56) References Cited

U.S. PATENT DOCUMENTS

| | | | | |
|---|---|---|---|---|
| 2017/0122757 | A1 | 5/2017 | Rajab et al. | |
| 2017/0168503 | A1* | 6/2017 | Amla | B60W 30/00 |
| 2018/0047293 | A1* | 2/2018 | Dudar | G05D 1/0257 |
| 2020/0211401 | A1 | 7/2020 | Oshida et al. | |
| 2022/0308577 | A1 | 9/2022 | Pasch et al. | |
| 2023/0019462 | A1* | 1/2023 | Busse | B60W 60/0011 |
| 2023/0050842 | A1 | 2/2023 | Diamond et al. | |
| 2024/0375654 | A1* | 11/2024 | Hirota | G06V 20/56 |

FOREIGN PATENT DOCUMENTS

| | | | |
|---|---|---|---|
| CN | 115877850 | A | 3/2023 |
| DE | 102017201551 | A1 | 8/2018 |
| DE | 102018103787 | A1 | 8/2018 |

* cited by examiner

*Primary Examiner* — Abby J Flynn
*Assistant Examiner* — Paulo Roberto Gonzalez Leite
(74) *Attorney, Agent, or Firm* — Christopher G. Darrow; Darrow Mustafa PC

(57) ABSTRACT

Systems, methods, and other embodiments described herein relate to aligning rear-sections of grouped vehicles for cooperative control and tracking that deters disturbances from surrounding vehicles. In one embodiment, a method includes connecting a following vehicle and a leading vehicle located in proximity wirelessly for reverse-following with rear-sections, the following vehicle and the leading vehicle forming a group. The method also includes aligning the rear-sections using a position and an orientation of the leading vehicle, the position and the orientation has centers of the rear-sections within a zone. The method also includes tracking a target path of the leading vehicle by the following vehicle automatically for the reverse-following.

20 Claims, 5 Drawing Sheets

SYSTEMS AND METHODS FOR COORDINATING AND ALIGNING GROUPED VEHICLES BY REAR-SECTIONS

TECHNICAL FIELD

The subject matter described herein relates, in general, to coordinating and aligning grouped vehicles for cooperative control, and, more particularly, to aligning rear-sections of grouped vehicles for the cooperative control and tracking that deters disturbances from surrounding vehicles.

BACKGROUND

Systems that control traffic encounter difficulties maintaining traffic flow due to environmental changes and variability. For example, a traffic light that controls traffic flow from an on-ramp to an expressway can underestimate the space available between vehicles for merging traffic. As such, traffic may back-up on the on-ramp from the underestimation. Furthermore, a road having automated and manually driven vehicles can exhibit varying traveling velocities that decrease safety and efficiency for traffic flow. Accordingly, vehicles encounter unnecessary congestion and disruptions to traffic flow on roads from systems that control traffic, thereby frustrating operators.

Moreover, systems may control traffic flow by linking vehicles virtually through wireless communications to coordinate motion with cooperative control (e.g., platooning). The linked vehicles virtually tow and follow a group formation. Such systems reduce traffic congestion through minimal vehicle spacing, increase energy efficiency with normalized speed, and improve operator comfort even on roads having varying environmental conditions, such as vehicles without connectivity capabilities. However, the linked vehicles encounter disturbances caused by surrounding vehicles. For example, the surrounding vehicles fail to identify the linked vehicles and merge in between the linked vehicles, thereby destroying a chain when the linked vehicles disengage the cooperative control and separate. Therefore, surrounding vehicles have difficulties distinguishing between linked and unlinked vehicles, thereby increasing disturbances to linked vehicles and harming traffic benefits from the linked vehicles.

SUMMARY

In one embodiment, example systems and methods relate to aligning rear-sections of grouped vehicles for cooperative control and tracking that deters disturbances from surrounding vehicles. In various implementations, systems control traffic by grouping vehicles through cooperative control (e.g., platooning) where the vehicles follow a linked formation (e.g., linear, offset, etc.) for improving traffic flow and energy consumption (e.g., fuel efficiency). In cooperative control, a following vehicle controls motion (e.g., cooperative adaptive cruise control (CACC)) on a road using information from a vehicle(s) traveling ahead that is transmitted through a wireless protocol (e.g., a vehicle-to-everything (V2X) communication). The control by the following vehicle sustains the formation of the group. However, these systems encounter challenges when sharing a road with other vehicles. For example, surrounding vehicles mistakenly cross into a lane having vehicles that are linked virtually because the linked vehicles mimic regular traffic for safety. Accordingly, the surrounding vehicles break chains of linked vehicles that reduces traffic benefits from cooperative control.

Therefore, in one embodiment, a coordination system virtually links a following vehicle and a leading vehicle for reverse-following with rear-sections (e.g., bumpers) within a group that prevents disturbances from surrounding vehicles readily identifying the group through an atypical formation. Here, the reverse-following may involve aligning rear-sections of the following vehicle and the leading vehicle for traversing a road through cooperative control (e.g., platooning). In this way, the leading vehicle faces a forward direction while the following vehicle faces a backward direction within grouped vehicles. Therefore, surrounding drivers would clearly understand that a human-driven vehicle is incapable of driving backward on the road, thereby reducing potential disturbances to the linked vehicles.

In various implementations, the coordination system establishes a wireless connection by the following vehicle when the leading vehicle is located in proximity for the reverse-following. Here, establishing the wireless connection may include comparing vehicle parameters for compatibility (e.g., automated driving, cooperative control, etc.) with the reverse-following between the following vehicle and the leading vehicle. Furthermore, the coordination system may allow the following vehicle to track a path of the leading vehicle automatically for the reverse-following, such as through leveraging a path history. For example, the coordination system adapts a destination point selected from the path history having motion parameters (e.g., velocity, acceleration, tilt, etc.) of the leading vehicle for the tracking. Thus, the coordination system facilitates reverse-following with rear-sections of grouped vehicles that visually communicate to surrounding vehicles the existence of linked vehicles, thereby deterring disturbances by the surrounding vehicles and improving traffic flow.

In one embodiment, a coordination system for aligning rear-sections of grouped vehicles for cooperative control and tracking that deters disturbances from surrounding vehicles is disclosed. The coordination system includes a memory storing instructions that, when executed by a processor, cause the processor to connect a following vehicle and a leading vehicle located in proximity wirelessly for reverse-following with rear-sections, the following vehicle and the leading vehicle forming a group. The instructions also include instructions to align the rear-sections using a position and an orientation of the leading vehicle, the position and the orientation has centers of the rear-sections within a zone. The instructions also include instructions to track a target path of the leading vehicle by the following vehicle automatically for the reverse-following.

In one embodiment, a non-transitory computer-readable medium for aligning rear-sections of grouped vehicles for cooperative control and tracking that deters disturbances from surrounding vehicles and including instructions that when executed by a processor cause the processor to perform one or more functions is disclosed. The instructions include instructions to connect a following vehicle and a leading vehicle located in proximity wirelessly for reverse-following with rear-sections, the following vehicle and the leading vehicle forming a group. The instructions also include instructions to align the rear-sections using a position and an orientation of the leading vehicle, the position and the orientation has centers of the rear-sections within a zone. The instructions also include instructions to track a target path of the leading vehicle by the following vehicle automatically for the reverse-following.

In one embodiment, a method for aligning rear-sections of grouped vehicles for cooperative control and tracking that deters disturbances from surrounding vehicles is disclosed. In one embodiment, the method includes connecting a following vehicle and a leading vehicle located in proximity wirelessly for reverse-following with rear-sections, the following vehicle and the leading vehicle forming a group. The method also includes aligning the rear-sections using a position and an orientation of the leading vehicle, the position and the orientation has centers of the rear-sections within a zone. The method also includes tracking a target path of the leading vehicle by the following vehicle automatically for the reverse-following.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
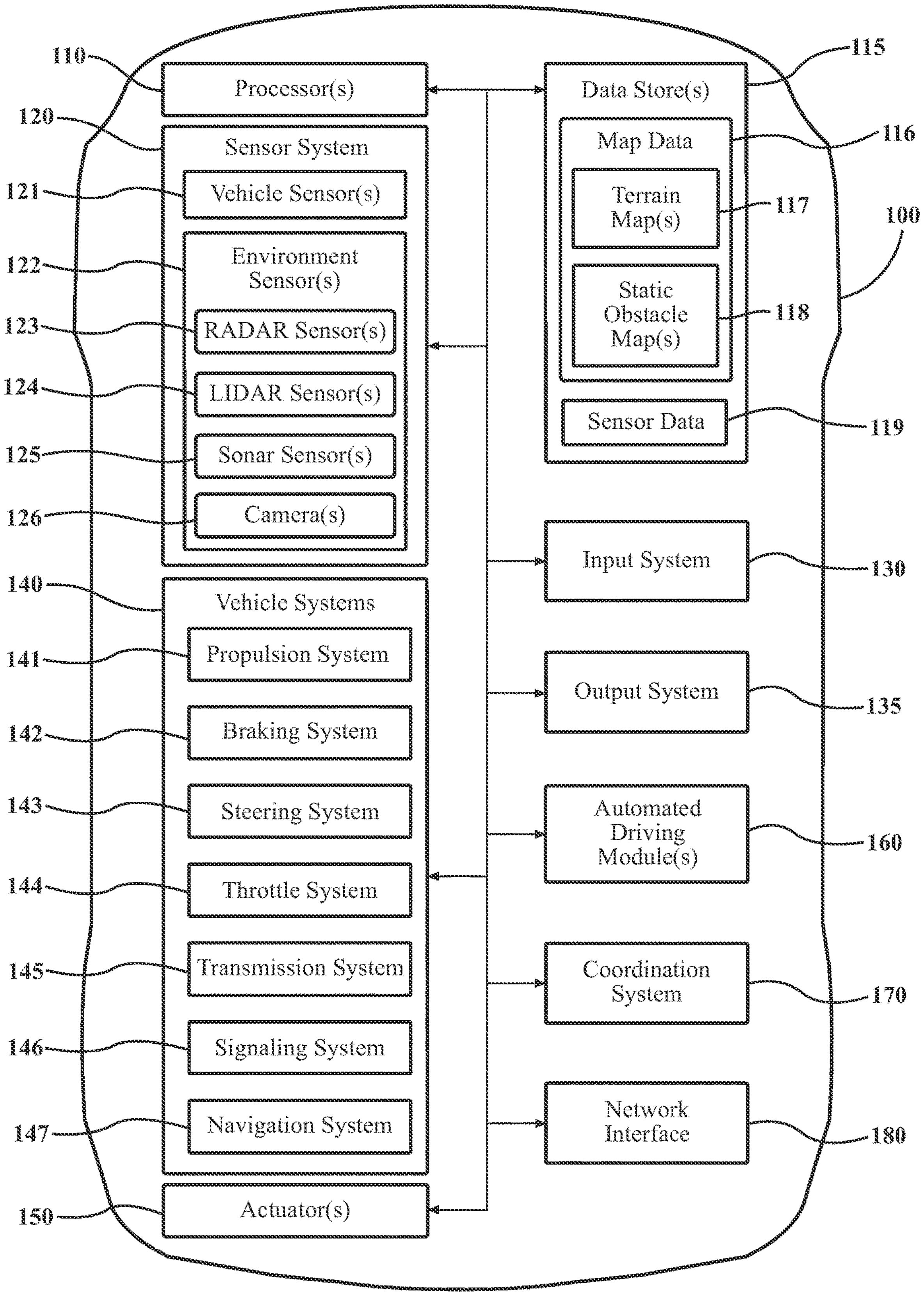
FIG. 1 illustrates one embodiment of a vehicle within which systems and methods disclosed herein may be implemented.

Systems, methods, and other embodiments associated with aligning rear-sections of grouped vehicles for cooperative control and tracking that deters disturbances from surrounding vehicles are disclosed herein. In various implementations, systems organizing vehicles for group travel (e.g., platooning, virtual towing, hitchless trailer, etc.) encounter disturbances from surrounding vehicles, such as other grouped vehicles and ungrouped vehicles. For example, an automated vehicle fails to recognize grouped vehicles on a highway since the vehicles appear as normal traffic. The automated vehicle attempts a risky merge into the lane having the grouped vehicles, thereby causing an unnecessary slow down in traffic flow. As such, the disturbance reduces efficiency benefits to the traffic flow from grouping vehicles (e.g., closer separation distance). Furthermore, disturbances decrease safety when suddenly cutting-in and breaking chains of grouped vehicles since these formations involve close following by vehicles.

Therefore, in one embodiment, a coordination system virtually links (e.g., towing) a following vehicle and a leading vehicle such that rear-sections are facing during cooperative control (e.g., platooning). Here, the following vehicle and the leading vehicle attempt to establish a wireless connection (e.g., a vehicle-to-everything (V2X) connection) when corresponding rear-sections (e.g., bumpers) are detected as being in proximity for reverse-following. The coordination system may detect the proximity by fusing sensor data (e.g., computer vision, radar, etc.) from the following vehicle and compare hardware compatibility for reverse-following with vehicle parameters. In one approach, the following vehicle aligns the rear-sections using the position and orientation (e.g., heading, tilt, etc.) of the leading vehicle such that rear-section centers are within a zone. For example, the zone is a three-dimensional (3D) space between the following vehicle and the leading vehicle that is safe for reverse-following. As such, the coordination system may generate a trajectory for the following vehicle to a target point within the zone that factors an estimated starting point, the position, and the orientation of the leading vehicle. For instance, the starting point is a computed distance to the center of the leading vehicle associated with the zone. The following vehicle steers to the target point manually or automatically for virtually linking with the leading vehicle. Therefore, the coordination system establishes a wireless connection and aligns rear-sections to virtually link vehicles for reverse-following, thereby reducing disturbances from surrounding vehicles that readily identify the grouping.

In various implementations, the following vehicle tracks a target path of the leading vehicle automatically for the reverse-following once the coordination system virtually links the vehicles. Here, the coordination system can adapt a path history of the leading vehicle being periodically or continuously recorded by the following vehicle for the reverse-following. For instance, the coordination system selects a destination point on a previous path from the path history having motion parameters (e.g., velocity, acceleration, tilt, etc.). The following vehicle modifies vehicle dynamics to match the motion parameters towards the destination point using a controller for rear-wheel steering. Furthermore, the coordination system implements the controller to minimize motion errors towards the destination point. Accordingly, the coordination system improves traffic flow and safety by establishing and managing reverse-following with rear-sections of grouped vehicles that visually communicate linked vehicles to surrounding vehicles, thereby deterring disturbances from the surrounding vehicles and improving traffic flow.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the coordination system 170 uses road-side units (RSU), consumer electronics (CE), mobile devices, robots, drones, and so on that benefit from the functionality discussed herein associated with aligning rear-sections of grouped vehicles for cooperative control and tracking that deters disturbances from surrounding vehicles. Furthermore, following and leading vehicles in the examples given may be configured as the vehicle 100 for the reverse-following. Also, a leading vehicle may be a relative term referring to a vehicle preceding a following vehicle or any other vehicle within grouped vehicles.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes the coordination system 170 that is implemented to perform methods and other functions as disclosed herein relating to aligning rear-sections of grouped vehicles for cooperative control and tracking that deters disturbances from surrounding vehicles.

Figure 2:
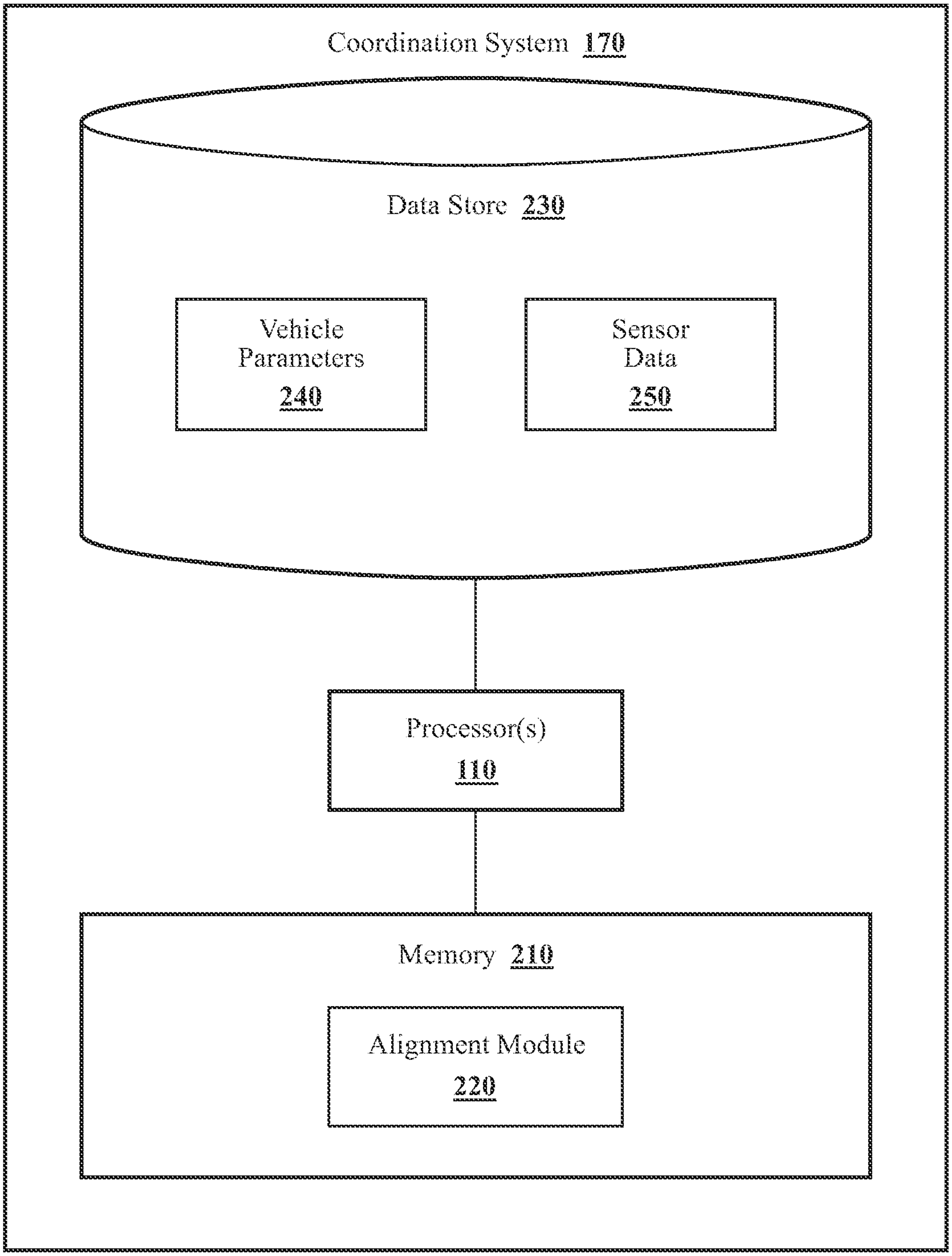
FIG. 2 illustrates one embodiment of a coordination system that is associated with aligning rear-sections of grouped vehicles for cooperative control and tracking that deters disturbances from surrounding vehicles.

With reference to FIG. 2, one embodiment of the coordination system 170 of FIG. 1 is further illustrated. The coordination system 170 is shown as including a processor(s) 110 from the vehicle 100 of FIG. 1. Accordingly, the processor(s) 110 may be a part of the coordination system 170, the coordination system 170 may include a separate processor from the processor(s) 110 of the vehicle 100, or the coordination system 170 may access the processor(s) 110 through a data bus or another communication path. In one embodiment, the coordination system 170 includes a memory 210 that stores an alignment module 220. The memory 210 is a random-access memory (RAM), a read-only memory (ROM), a hard-disk drive, a flash memory, or other suitable memory for storing the alignment module 220. The alignment module 220 is, for example, computer-readable instructions that when executed by the processor(s) 110 cause the processor(s) 110 to perform the various functions disclosed herein.

The coordination system 170 as illustrated in FIG. 2 is generally an abstracted form of the coordination system 170. In FIG. 2, the alignment module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the alignment module 220, in one embodiment, acquires the sensor data 250 that includes at least camera images. In further arrangements, the alignment module 220 acquires the sensor data 250 from further sensors such as radar sensors 123, light detection and ranging (LIDAR) sensors 124, and other sensors as may be suitable for identifying vehicles and locations of the vehicles.

Accordingly, the alignment module 220, in one embodiment, controls the respective sensors to provide the data inputs in the form of the sensor data 250. Additionally, while the alignment module 220 is discussed as controlling the various sensors to provide the sensor data 250, in one or more embodiments, the alignment module 220 can employ other techniques to acquire the sensor data 250 that are either active or passive. For example, the alignment module 220 may passively sniff the sensor data 250 from a stream of electronic information provided by the various sensors to further components within the vehicle 100. Moreover, the alignment module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

In addition to locations of surrounding vehicles, the sensor data 250 may also include, for example, information about lane markings, and so on. Moreover, the alignment module 220, in one embodiment, controls the sensors to acquire the sensor data 250 about an area that encompasses 360 degrees about the vehicle 100 as a comprehensive assessment of the surrounding environment. Of course, in alternative embodiments, the alignment module 220 may acquire the sensor data about a forward direction alone when, for example, the vehicle 100 is not equipped with further sensors to include additional regions about the vehicle and/or the additional regions are not scanned due to other reasons.

Moreover, in one embodiment, the coordination system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the alignment module 220 in executing various functions. In one embodiment, the data store 230 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on. Furthermore, as explained below, the sensor data 250 includes information from rear-facing sensors (e.g., a camera, a radar sensor, an ultrasonic sensor, etc.) and forward-facing sensors (e.g., a camera, a radar sensor, a LIDAR sensor, etc.) that the coordination system 170 processes for aligning vehicles and the reverse-following.

In one embodiment, the data store 230 further includes the vehicle parameters 240 for the following vehicle and the leading vehicle. Here, the vehicle parameters 240 may include vehicle capabilities and hardware configurations associated with executing automated driving, cooperative control, and so on. Furthermore, the vehicle parameters 240 may include motion parameters such as velocity, acceleration, tilt, and so on about the leading vehicle estimated by the following vehicle using the sensor data 250. In addition, the vehicle parameters 240 may also include vehicle dimensions such that a group comprises similarly shaped vehicles that improves safety by having defined alignment of rear-sections within a zone (e.g., 250-500 cubic ft) for reverse-following. In one approach, the motion parameters are received from the leading vehicle by the following vehicle over a wireless connection using the network interface 180 utilizing one of a V2X protocol (e.g., cellular V2X), a modem of the vehicle 100, dedicated short-range communications (DSRC) protocol, and so on.

Figure 3A:
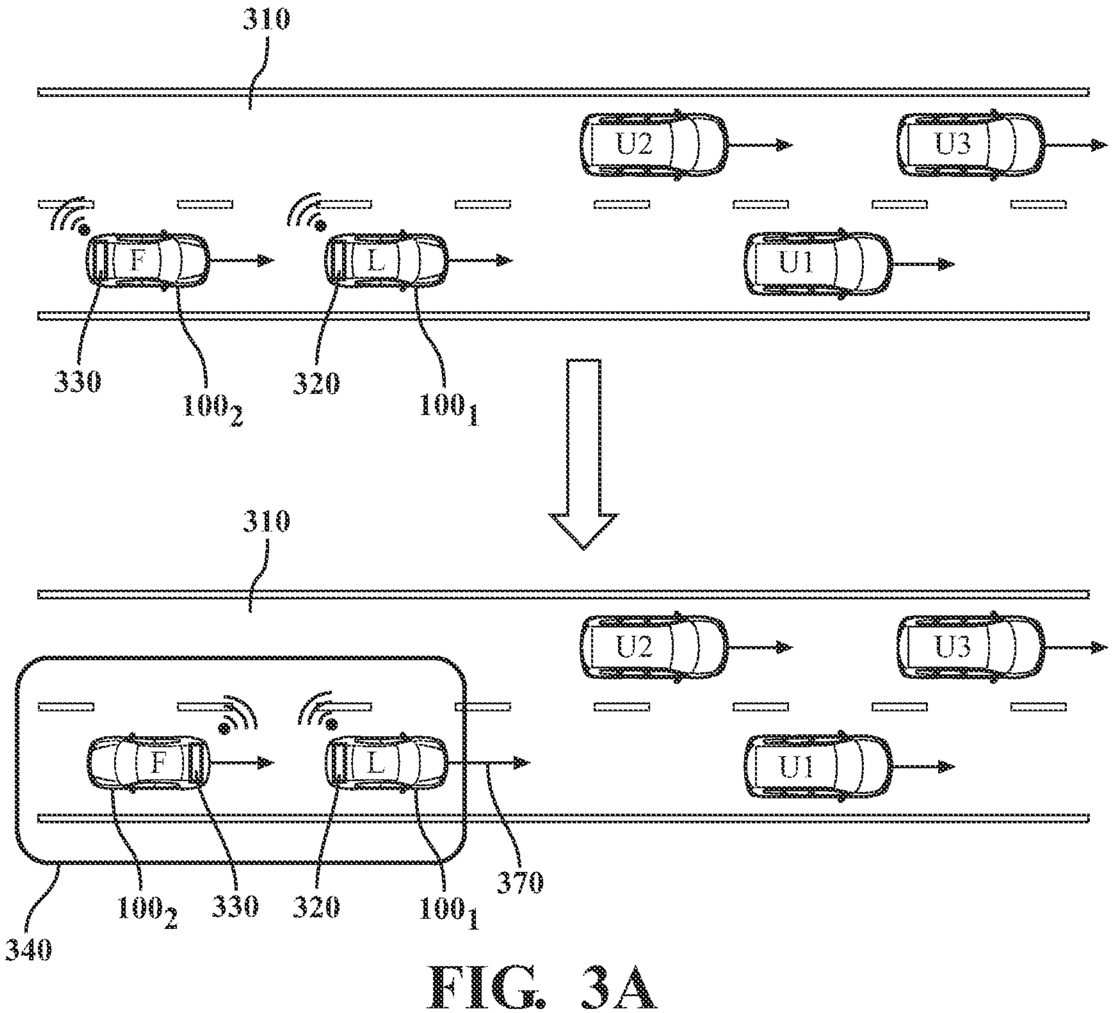
FIGS. 3A and 3B illustrate one embodiment of the coordination system of FIG. 2 connecting and aligning following and leading vehicles for reverse-following.
Figure 3B:
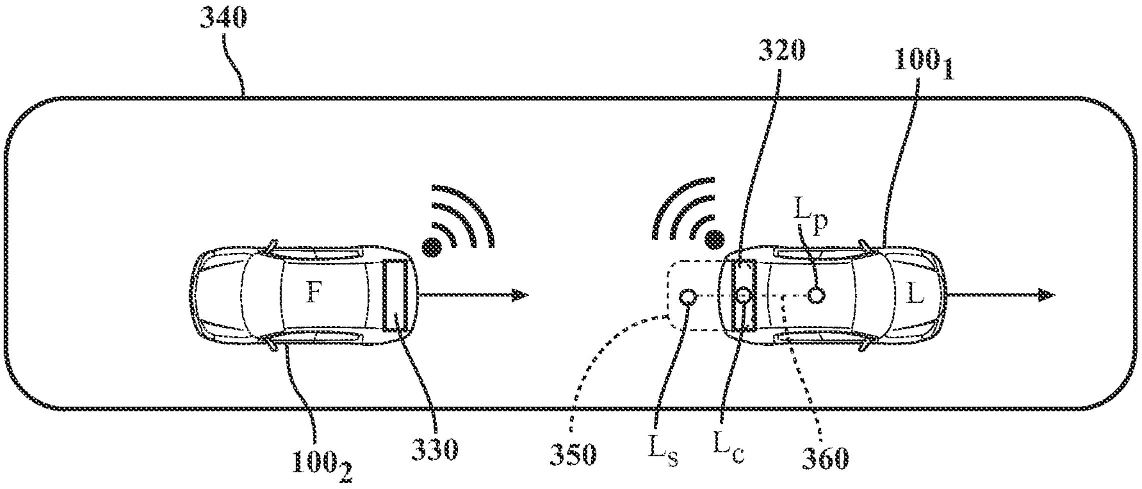

Turning now to FIGS. 3A and 3B, one embodiment of the coordination system 170 of FIG. 2 connecting and aligning following and leading vehicles for reverse-following is illustrated. Here, the alignment module 220, in one embodiment, is further configured to perform additional tasks beyond controlling the respective sensors to acquire and provide the sensor data 250. For example, the alignment module 220 includes instructions that cause the processor 110 to direct rear-sections (e.g., a bumper, a bed, a tail, a tailgate, etc.) among vehicles using position and orientation of the leading vehicle such that centers of the rear-sections are within a zone. For one approach, in FIG. 3A a leading vehicle $\mathbf{100}_1$ having the rear-section 320 and the following vehicle $\mathbf{100}_2$ having the rear-section 330 are traveling on the road 310. The coordination system 170 may arrange a connection between the leading vehicle $\mathbf{100}_1$ and the following vehicle $\mathbf{100}_2$ located in proximity wirelessly that forms the group 340 (e.g., platooning, virtual towing, hitchless trailer, etc.) for reverse-following. In various implementations, the group 340 is formed with any number of vehicles 100*n* following a similar approach as that with the leading vehicle $\mathbf{100}_1$ and the following vehicle $\mathbf{100}_2$. In one approach, the group 340 exists with platooning vehicles cooperatively traveling in a forward-facing direction on the road 310 and the leading vehicle $\mathbf{100}_1$ and the following vehicle $\mathbf{100}_2$ coordinate for the reverse-following at different positions within the group 340 (e.g., center). Accordingly, the coordination system 170 allows having the group 340 formed with forward-facing and reverse-following vehicles for clear identification, thereby increasing grouping flexibility while reducing disturbances to a group from surrounding vehicles.

In various implementations, setting up the connection may include the coordination system 170 executing a handshaking function for establishing reverse-following. This may involve comparing the vehicle parameters 240 for compatibility (e.g., automated driving, cooperative control, etc.) with the reverse-following between the leading vehicle $\mathbf{100}_1$ and the following vehicle $\mathbf{100}_2$. For instance, the leading vehicle $\mathbf{100}_1$ and the following vehicle $\mathbf{100}_2$ form the group 340 when automated capabilities are above a certain level (e.g., level 3) and have defined alignment of rear-sections with a zone (e.g., 250-500 cubic feet) for reverse-following safely. In one approach, the coordination system 170 outputs the results of the handshaking for approval or denial by operators of the leading vehicle $\mathbf{100}_1$ and the following vehicle $\mathbf{100}_2$ as a safety precaution. Furthermore, unconnected vehicles U1-U3 on the road 310 may be ungrouped or grouped for cooperative travel but unable to communicate with the leading vehicle $\mathbf{100}_1$ and the following vehicle $\mathbf{100}_2$. Accordingly, the reverse-following may prevent disturbances (e.g., cut-ins) from unconnected vehicles U1-U3 on the road 310 that readily identify the group 340 actively traveling together through the atypical formation.

Regarding details on aligning rear-sections, the leading vehicle $\mathbf{100}_1$ and the following vehicle $\mathbf{100}_2$ can initially pull-over or park on the road 310. As illustrated in FIG. 3B, the coordination system 170 may estimate a starting point $L_s$, a position $L_p$, and an orientation (e.g., heading, tilt, etc.) about the leading vehicle $\mathbf{100}_1$ with information acquired from the sensor data 250, the vehicle parameters 240, and the navigation system 147 (e.g., global positioning system (GPS) data). The following vehicle $\mathbf{100}_2$ may receive part of this information from the leading vehicle $\mathbf{100}_1$ over the connection using V2X protocol (e.g., cellular V2X), DSRC protocol, and so on. Here, the starting point $L_s$ may represent a position where reverse-following commences. Furthermore, the starting point $L_s$ has a computed distance 360 to a center $L_c$ of the rear-section 320 and the position $L_p$. The starting point $L_s$, or the center $L_c$ may be within the zone 350 that is a 3D space between the leading vehicle $\mathbf{100}_1$ and the following vehicle $\mathbf{100}_2$ for safe reverse-following. In one approach, the alignment module 220 uses a machine learning algorithm (e.g., a convolutional neural network (CNN), deep convolutional encoder-decoder architectures, etc.), to perform semantic segmentation over the sensor data 250 for estimating the starting point $L_s$, the center $L_c$, or the position $L_p$ when such information is missing about the leading vehicle $\mathbf{100}_1$. For example, the coordination system 170 in the following vehicle $\mathbf{100}_2$ generates semantic labels for separate object classes represented in an image of a scene having the leading vehicle $\mathbf{100}_1$ and other objects. As such, the coordination system 170 can process the semantic labels in a depth model for estimating the starting point $L_s$, the center $L_c$, or the position $L_p$ and initializing the reverse-following.

After the following vehicle $\mathbf{100}_2$ has initial coordinates and data about the leading vehicle $\mathbf{100}_1$, the coordination system 170 generates a trajectory to a target point that is within a range (e.g., 2 meters) or minimal offset from the starting point $L_s$ and the zone 350 for creating a virtual link between the vehicles. Here, the trajectory factors the starting point $L_s$, the position $L_p$, and the orientation of the leading vehicle $\mathbf{100}_1$ for an operator manually or the automated driving module(s) 160 automatically to steer towards the target point and align the vehicles. In one approach, the coordination system 170 assists the steering by generating additional guidance information through fusing data from rear-facing cameras of the camera(s) 126, the radar sensor 123, or the navigation system 147 when the following vehicle $\mathbf{100}_2$ is distant from the leading vehicle $\mathbf{100}_1$. Furthermore, the coordination system 170 can rely on data from ultrasonic sensors for the following vehicle $\mathbf{100}_2$ when the trajectory is within a limited distance of the target point (e.g., 2 meters). Therefore, the coordination system 170 safely links the leading vehicle $\mathbf{100}_1$ and the following vehicle $\mathbf{100}_2$ for reverse-following through alignment of points in the zone 350 and the generated trajectory.

Referring again to FIG. 3A, the following vehicle $\mathbf{100}_2$ may track a target path 370 of the leading vehicle $\mathbf{100}_1$ automatically for the reverse-following with the automated driving module(s) 160 once the vehicles are linked. For example, the coordination system 170 periodically or continuously records and adapts a path history of the leading vehicle $\mathbf{100}_1$ from information received from the leading vehicle $\mathbf{100}_1$ and the sensor data 250. The information may include speed, acceleration, position, heading at position, and so on received using a V2X connection between the vehicles. The coordination system 170 can select a destination point on a previous path from the path history where the destination point has motion parameters (e.g., velocity, acceleration, etc.) about the leading vehicle $\mathbf{100}_1$.

In one approach, the following vehicle $\mathbf{100}_2$ modifies vehicle dynamics to match the motion parameters, such as through utilizing controllers for rear-wheel steering that minimize motion error to the destination point. The motion error may include lateral error, velocity error, acceleration error, and so on to the destination point. For instance, the controller utilizes one of a linear-quadratic regulator (LQR), proportional integral derivative (PID), model predictive control (MPC), and an Ackermann function for lateral and longitudinal control and the rear-wheel steering implemented with the vehicle systems 140. The Ackermann function can mimic a rear-wheel-steer Ackermann geometry such that wheels of the following vehicle $100_2$ have associated axles arranged as radii of circles with a common center point, thereby avoiding tire slip sideways when following the target path 370 around a curve. In this way, the center point of all of the circles traced by wheels will lie at a common point at any steering angle. Accordingly, the following vehicle $100_2$ may safely and accurately track the target path 370 of the leading vehicle $100_1$ automatically for the reverse-following by adapting path history and vehicle dynamics.

In addition to the aforementioned benefits, reverse-following of grouped vehicles also improves cooperative control on the road 310. For example, the following vehicle $100_2$ receives information about the target path 370 from the leading vehicle $100_1$ using a V2X connection (e.g., cellular V2X). The coordination system 170 adapts the target path 370 using data acquired from forward-facing sensors of the following vehicle $100_2$ about surrounding vehicles trailing the reverse-following. Here, the coordination system 170 leverages the extended range, power, and accuracy of forward-facing sensors (e.g., a camera, a radar sensor, a LIDAR sensor, etc.) to gain reliable data about trailing vehicles rather than rear-facing sensors (e.g., a camera, a radar sensor, an ultrasonic sensor, etc.) having more limited capabilities. For example, a front-facing camera in the following vehicle $100_2$ has a resolution of ten megapixels and a rear-facing backup camera has a resolution of 5 megapixels. Similarly, a front radar may have a range of 30 meters and a rear-facing or rear-corner radar has a range of 10 meters. In one approach, the following vehicle $100_2$ communicates the data wirelessly to the leading vehicle $100_1$ for adapting motion dynamics of the group 340 and improving lane tracking. Accordingly, the reverse-following takes advantage of the following vehicle $100_2$ flipped and facing backward in a group by leveraging more powerful sensors to detect vehicles approaching from the rear.

In various implementations, the reverse-following enhances the fuel efficiency of the group 340 through aerodynamic improvements. For example, the group 340 having two minivans both facing forward lacks a continuous silhouette for unobstructed airflow along rooflines, thereby increasing drag particularly at elevated speeds. Here, the airflow dips into a deep gap from the tail of the leading vehicle $100_1$ to the hood of the following vehicle $100_2$, creating unnecessary drag that reduces fuel efficiency. However, the airflow is eliminated when the minivans are reverse-following since the deep gap is filled with the rear-section of the following vehicle $100_2$. In other words, the coordination system 170 can closely align flat rear-sections of the minivans and create a continuous roofline that allows smooth airflow, thereby reducing drag on the group 340 and increasing fuel efficiency.

Figure 4:
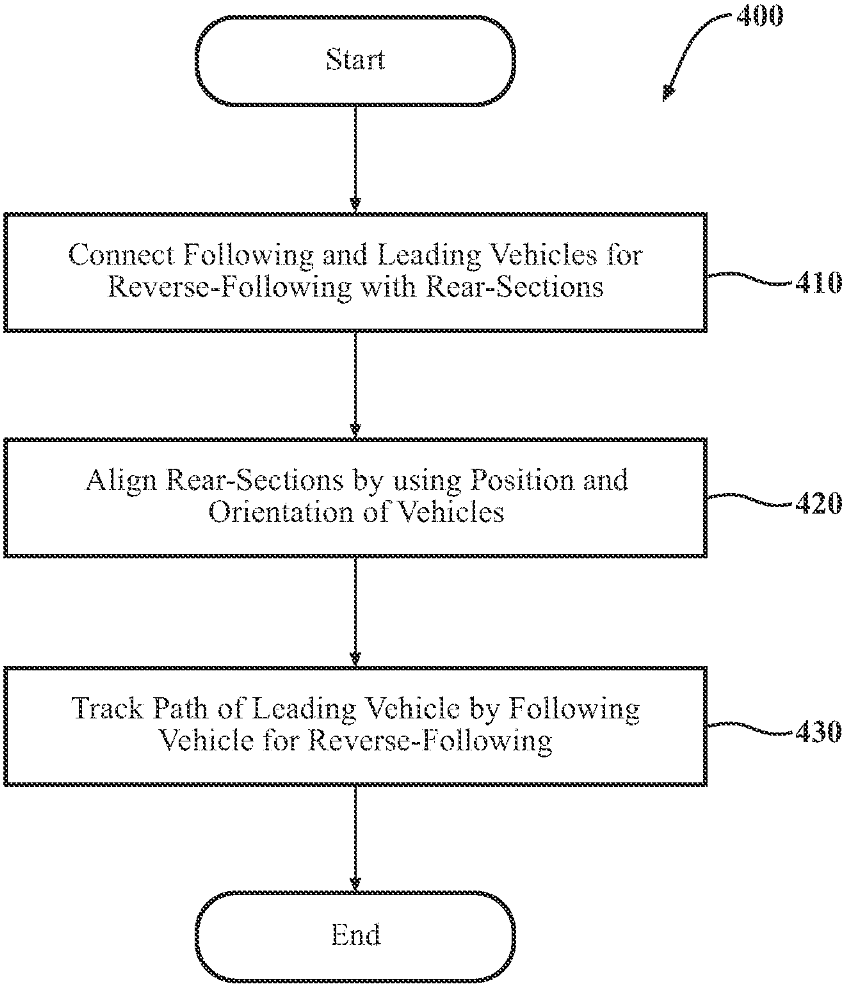
FIG. 4 illustrates one embodiment of a method that is associated with aligning rear-sections of grouped vehicles for the reverse-following and tracking a path of the leading vehicle.

Now turning to FIG. 4, a flowchart of a method 400 that is associated with aligning rear-sections of grouped vehicles for the reverse-following and tracking a path of a leading vehicle is illustrated. Method 400 will be discussed from the perspective of the coordination system 170 of FIGS. 1 and 2. While method 400 is discussed in combination with the coordination system 170, it should be appreciated that the method 400 is not limited to being implemented within the coordination system 170 but is instead one example of a system that may implement the method 400.

At 410, the coordination system 170 connects the following and leading vehicles for reverse-following with rear-sections (e.g., a bumper, a bed, a tail, a tailgate, etc.). Here, the coordination system 170 may arrange a connection between the following vehicle and the leading vehicle within a proximate range wirelessly to form a group (e.g., platooning, virtual towing, hitchless trailer, etc.) for reverse-following. In one approach, the group already exists with vehicles cooperatively traveling in a forward-facing direction. The following and leading vehicles can attempt to join the group and coordinate the reverse-following at different positions within the group (e.g., back-end, center, etc.). Furthermore, setting up the connection may include the coordination system 170 executing a handshaking function that involves comparing the vehicle parameters 240 for compatibility (e.g., automated driving, cooperative control, etc.) with the reverse-following between the vehicles. For example, the vehicles form the group when automated capabilities are above a certain level (e.g., level 3) and have defined alignment of rear-sections with a zone (e.g., 250-500 cubic feet) for reverse-following safely. In one approach, the coordination system 170 outputs the results of the handshaking for approval or denial by operators of the vehicles for safety or comfort.

At 420, the alignment module 220 aligns the rear-sections by using the position and orientation of the leading vehicle. As previously explained, the leading and following vehicles may initially be stationary on a road, parking lot, and so on. In one approach, the coordination system 170 estimates a starting point, a position, and an orientation (e.g., heading, tilt, etc.) about the leading vehicle with information acquired from the sensor data 250, the vehicle parameters 240, and the navigation system 147 (e.g., global positioning system (GPS) data) for alignment operations by the following vehicle. Here, the following vehicle may receive this information in part from the leading vehicle over the connection using a V2X protocol (e.g., cellular V2X), DSRC protocol, and so on for aggregation with local data. Furthermore, the starting point may represent a position where reverse-following commences with a computed distance to a center of the rear-section and the position for the leading vehicle.

Moreover, the starting point or the center may be within a zone that is a 3D space between the rear-sections of the leading and following vehicles for safe reverse-following. In one approach, the alignment module 220 also uses a machine learning algorithm (e.g., a CNN, deep convolutional encoder-decoder architectures etc.), to perform semantic segmentation over the sensor data 250 for estimating the starting point, the center, or the position when such information is missing about the leading vehicle. As previously explained, the coordination system 170 in the following vehicle can generate semantic labels for separate object classes represented in an image of a scene having the leading vehicle and other objects. Accordingly, the coordination system 170 may process the semantic labels in a depth model for estimating the starting point, the center, or the position.

After the following vehicle has initial coordinates and data about the leading vehicle, the coordination system 170 generates a trajectory to a target point that is within a range (e.g., 2 meters) or minimal offset from the starting point and the zone for creating a virtual link between the vehicles. Here, an operator manually or the automated driving module 160 automatically steers the following vehicle towards the target point using the trajectory that factors the starting point, the position, and the orientation of the leading vehicle. This may include generating additional guidance information through fusing data from rear-facing cameras of the camera(s) 126, the radar sensor 123, or the navigation system 147 by the following vehicle about the leading vehicle. Thus, the coordination system 170 safely links the leading vehicle and the following vehicle for reverse-following through alignment within the zone and by following the generated trajectory.

At 430, the coordination system 170 of the following vehicle tracks the leading vehicle for the reverse-following after linking, such as automatically with the automated driving module(s) 160. In one approach, the coordination system 170 aggregates information received from the leading vehicle and the sensor data 250 and periodically or continuously records and adapts a path history of the leading vehicle. The information may include speed, acceleration, position, heading at position, and so on received using a V2X connection between the vehicles. As such, the coordination system 170 can select a destination point on a previous path from the path history about the leading vehicle having motion parameters (e.g., velocity, acceleration, etc.) for the tracking.

In various implementations, the following vehicle modifies vehicle dynamics to match the motion parameters, such as through utilizing controllers for rear-wheel steering that minimize motion error to the destination point. The motion error may include lateral error, velocity error, acceleration error, and so on to the destination point. As previously explained, the controller may utilize one of an LQR, a PID, an MPC, and an Ackermann function for lateral and longitudinal control and the rear-wheel steering by the vehicle systems 140. Therefore, the following vehicle can safely and accurately track a target path of the leading vehicle automatically for the reverse-following by adapting path history and vehicle dynamics.

Regarding additional benefits of reverse-following, the coordination system 170 adapts the target path using data acquired from forward-facing sensors of the following vehicle about surrounding vehicles trailing the reverse-following and the group. In this way, the coordination system 170 leverages the extended range, power, and accuracy of forward-facing sensors (e.g., a camera, a radar sensor, a LIDAR sensor, etc.) to gain data about trailing vehicles rather than rear-facing sensors (e.g., a camera, a radar sensor, an ultrasonic sensor, etc.) having limited capabilities. In one approach, the following vehicle communicates the data wirelessly to the leading vehicle for adapting motion dynamics of the group and lane tracking, thereby improving cooperative control. Accordingly, the reverse-following takes advantage of the following vehicle facing backward in a group by leveraging more powerful sensors to detect vehicles approaching from the rear while making reverse-following more identifiable to surrounding vehicles.

Figure 5:
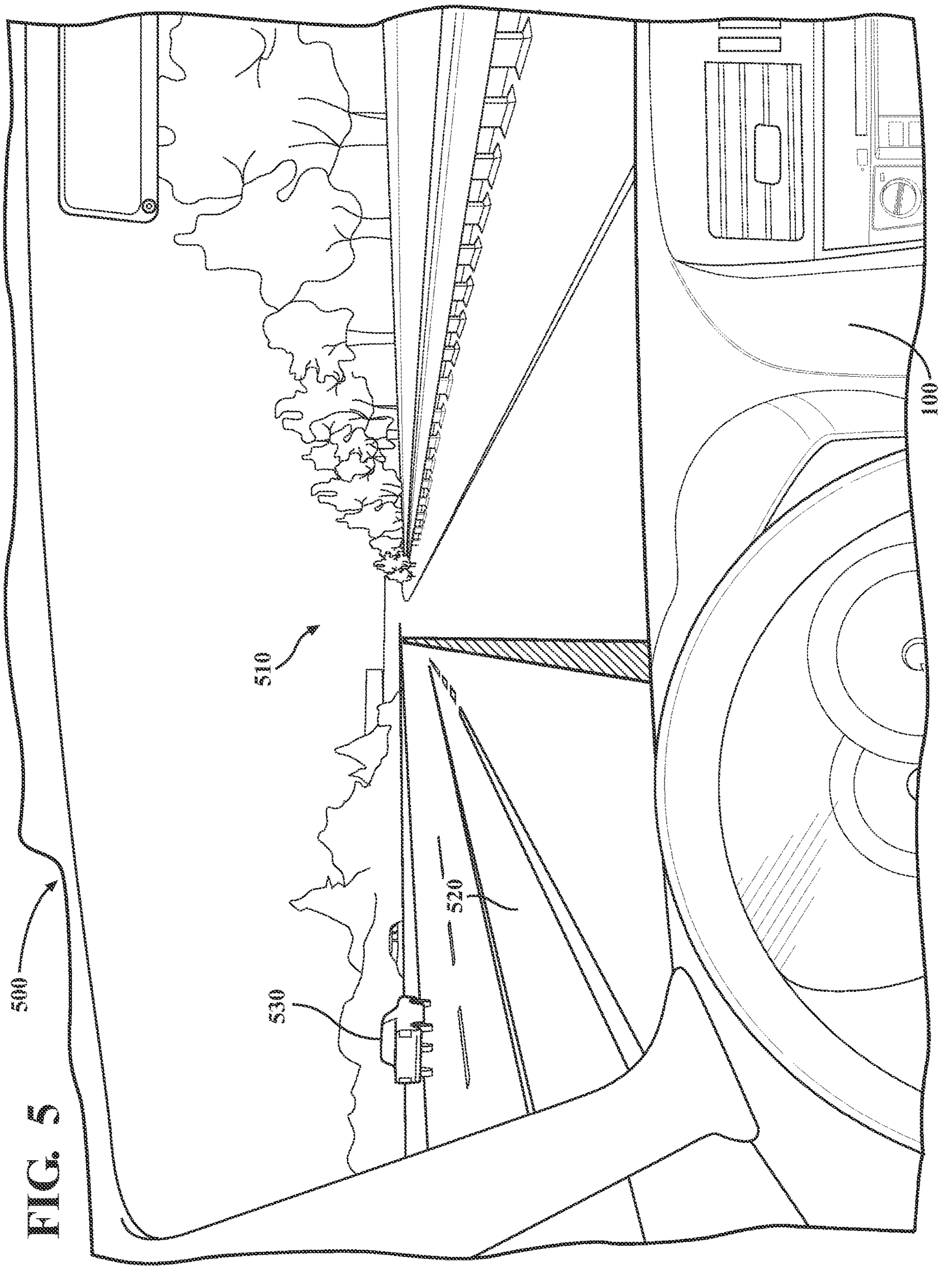
FIG. 5 illustrates an example of the leading vehicle virtually linked and towing the following vehicle in a reverse-following formation while navigating a road.

Turning to FIG. 5, an example 500 of the leading vehicle virtually linked and towing a following vehicle in a reverse-following formation while navigating a road is illustrated. In the driving environment 510, the leading vehicle 100 is virtually linked to a following vehicle after a handshaking process and aligning rear-sections. As such, the leading vehicle 100 and the following vehicle are traveling on the road 520 and attempt to merge into a different road section having the vehicle 530. Here, the reverse-following readily indicates that the leading and following vehicles are grouped to the vehicle 530 and surrounding vehicles. Accordingly, the reverse-following with rear-sections of grouped vehicles visually communicates to surrounding vehicles on the road 520 the existence of grouped and linked vehicles, thereby deterring disturbances by the surrounding vehicles and improving traffic flow.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, programmable read-only memory (PROM), erasable programmable read-only memory (EPROM), electrically erasable programmable read-only memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a GPS, a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the coordination system 170, and/or the automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the movement of the vehicle 100. The processor(s) 110, the coordination system 170, and/or the automated driving module(s) 160 may control some or all of the vehicle systems 140 and, thus, may be partially or fully autonomous as defined by the society of automotive engineers (SAE) levels 0 to 5.

The processor(s) 110, the coordination system 170, and/or the automated driving module(s) 160 can be operatively connected to communicate with the various vehicle systems 140 and/or individual components thereof. For example, the processor(s) 110, the coordination system 170, and/or the automated driving module(s) 160 can be in communication to send and/or receive information from the various vehicle systems 140 to control the movement of the vehicle 100. The processor(s) 110, the coordination system 170, and/or the automated driving module(s) 160 may control some or all of the vehicle systems 140.

The processor(s) 110, the coordination system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the coordination system 170, and/or the automated driving module(s) 160 can control the direction and/or speed of the vehicle 100. The processor(s) 110, the coordination system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine the position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the coordination system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5 but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A coordination system comprising:

a memory storing instructions that, when executed by a processor, cause the processor to:

connect a following vehicle and a leading vehicle located in proximity wirelessly for reverse-following with rear-sections, the following vehicle and the leading vehicle forming a group;

align the rear-sections using a starting point, a position, and an orientation of the leading vehicle, the position and the orientation have centers of the rear-sections within a three-dimensional zone, and the three-dimensional zone is a defined three-dimensional space on the rear-sections of the leading vehicle; and track a target path and a target point of the leading vehicle by the following vehicle automatically for the reverse-following, the target point being within a predetermined range and offset with the starting point and the leading vehicle.

2. The coordination system of claim 1, wherein the instructions to align the rear-sections further include instructions to:

estimate, using a learning model, the starting point of the leading vehicle, the position, and the orientation with sensor data that is acquired, the starting point having a computed distance to one of the centers and the position;

generate a trajectory for the following vehicle to the target point within the three-dimensional zone by factoring the starting point, the position, and the orientation, the three-dimensional zone being a safe gap between the following vehicle and the leading vehicle; and steer the following vehicle to the target point using the trajectory for virtually linking the following vehicle and the leading vehicle.

3. The coordination system of claim 2, wherein the instructions to track the target path of the leading vehicle further include instructions to:

adapt a path history of the leading vehicle for the reverse-following by the following vehicle, the path history being continuously recorded by the following vehicle;

select a destination point on a previous path from the path history by the following vehicle, the destination point having motion parameters that include a velocity and an acceleration of the leading vehicle; and modify vehicle dynamics of the following vehicle to match the motion parameters associated with the destination point, the vehicle dynamics implement a controller for rear-wheel steering that minimizes motion error to the destination point.

4. The coordination system of claim 3, wherein the controller utilizes one of a linear-quadratic regulator (LQR), a proportional integral derivative (PID), model predictive control (MPC), and an Ackermann function for lateral and longitudinal control and the rear-wheel steering of the following vehicle.

5. The coordination system of claim 1 further including instructions to:

receive information about the target path by the following vehicle from the leading vehicle using a cellular connection;

adapt the target path using sensor information acquired from forward-facing sensors of the following vehicle about surrounding vehicles trailing the reverse-following; and communicate the sensor information wirelessly to the leading vehicle for adapting motion dynamics of the group.

6. The coordination system of claim 5, wherein the forward-facing sensors are one of a camera, a radar sensor, and a light detection and ranging (LIDAR) sensor having increased accuracy and greater range than rear-facing sensors.

7. The coordination system of claim 1, wherein the group exists with platooning vehicles linked and cooperatively traveling prior to the reverse-following and the leading vehicle is near a center of the group.

8. The coordination system of claim 1, wherein the leading vehicle faces a forward direction and the following vehicle faces a backward direction within the group and other vehicles within the group face the forward direction.

9. The coordination system of claim 1, wherein the rear-sections are one of a bumper, a bed, a tail, and a tailgate and the group forms a vehicle platoon.

10. A non-transitory computer-readable medium comprising:

instructions that when executed by a processor cause the processor to:

connect a following vehicle and a leading vehicle located in proximity wirelessly for reverse-following with rear-sections, the following vehicle and the leading vehicle forming a group;

align the rear-sections using a starting point, a position, and an orientation of the leading vehicle, the position and the orientation have centers of the rear-sections within a three-dimensional zone, and the three-dimensional zone is a defined three-dimensional space on the rear-sections of the leading vehicle; and track a target path and a target point of the leading vehicle by the following vehicle automatically for the reverse-following, the target point being within a predetermined range and offset with the starting point and the leading vehicle.

11. The non-transitory computer-readable medium of claim 10, wherein the instructions to align the rear-sections further include instructions to:

estimate, using a learning model, the starting point of the leading vehicle, the position, and the orientation with sensor data that is acquired, the starting point having a computed distance to one of the centers and the position;

generate a trajectory for the following vehicle to the target point within the three- dimensional zone by factoring the starting point, the position, and the orientation, the three- dimensional zone being a safe gap between the following vehicle and the leading vehicle; and steer the following vehicle to the target point using the trajectory for virtually linking the following vehicle and the leading vehicle.

12. A method comprising:

connecting a following vehicle and a leading vehicle located in proximity wirelessly for reverse-following with rear-sections, the following vehicle and the leading vehicle forming a group;

aligning the rear-sections using a starting point, a position, and an orientation of the leading vehicle, the position and the orientation have centers of the rear-sections within a three-dimensional zone, and the three-dimensional zone is a defined three-dimensional space on the rear-sections of the leading vehicle; and tracking a target path and a target point of the leading vehicle by the following vehicle automatically for the reverse-following, the target point being within a predetermined range and offset with the starting point and the leading vehicle.

13. The method of claim 12, wherein aligning the rear-sections further includes:

estimating, using a learning model, the starting point of the leading vehicle, the position, and the orientation with sensor data that is acquired, the starting point having a computed distance to one of the centers and the position;

generating a trajectory for the following vehicle to the target point within the three-dimensional zone by factoring the starting point, the position, and the orientation, the three-dimensional zone being a safe gap between the following vehicle and the leading vehicle; and steering the following vehicle to the target point using the trajectory for virtually linking the following vehicle and the leading vehicle.

14. The method of claim 13, wherein tracking the target path of the leading vehicle further includes:

adapting a path history of the leading vehicle for the reverse-following by the following vehicle, the path history being continuously recorded by the following vehicle;

selecting a destination point on a previous path from the path history by the following vehicle, the destination point having motion parameters that include a velocity and an acceleration of the leading vehicle; and modifying vehicle dynamics of the following vehicle to match the motion parameters associated with the destination point, the vehicle dynamics implement a controller for rear-wheel steering that minimizes motion error to the destination point.

15. The method of claim 14, wherein the controller utilizes one of a linear-quadratic regulator (LQR), a proportional integral derivative (PID), model predictive control (MPC), and an Ackermann function for lateral and longitudinal control and the rear-wheel steering of the following vehicle.

16. The method of claim 12 further comprising:

receiving information about the target path by the following vehicle from the leading vehicle using a cellular connection;

adapting the target path using sensor information acquired from forward-facing sensors of the following vehicle about surrounding vehicles trailing the reverse-following; and communicating the sensor information wirelessly to the leading vehicle for adapting motion dynamics of the group.

17. The method of claim 16, wherein the forward-facing sensors are one of a camera, a radar sensor, and a light detection and ranging (LIDAR) sensor having increased accuracy and greater range than rear-facing sensors.

18. The method of claim 12, wherein the group exists with platooning vehicles linked and cooperatively traveling prior to the reverse-following and the leading vehicle is near a center of the group.

19. The method of claim 12, wherein the leading vehicle faces a forward direction and the following vehicle faces a backward direction within the group and other vehicles within the group face the forward direction.

20. The method of claim 12, wherein the rear-sections are one of a bumper, a bed, a tail, and a tailgate and the group forms a vehicle platoon.

* * * * *